US006988036B2

(12) United States Patent (10) Patent No.: US 6,988,036 B2
Sakai et al. (45) Date of Patent: Jan. 17, 2006

(54) NAVIGATION TERMINAL, NAVIGATION SYSTEM, NAVIGATION PROGRAM AND DRIVE GUIDE METHOD

(75) Inventors: Akira Sakai, Saitama (JP); Takashi Kawakami, Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/659,268

(22) Filed: Sep. 11, 2003

(65) Prior Publication Data

US 2004/0054467 A1 Mar. 18, 2004

(30) Foreign Application Priority Data

Sep. 13, 2002 (JP) ............................ P2002-268373

(51) Int. Cl.
*G01C 21/00* (2006.01)
(52) U.S. Cl. ................. 701/209; 701/201; 340/995.19; 340/995.23
(58) Field of Classification Search ................ 701/209, 701/200, 201, 23, 1; 340/995.19, 995.23; 73/178 R
See application file for complete search history.

(56) References Cited

U.S. PATENT DOCUMENTS

| 5,938,720 | A | * | 8/1999 | Tamai ........................ 701/209 |
| 6,249,740 | B1 | * | 6/2001 | Ito et al. ..................... 701/200 |
| 6,512,464 | B2 | * | 1/2003 | Takahashi et al. .......... 340/905 |
| 6,567,743 | B1 | * | 5/2003 | Mueller et al. ............. 701/209 |
| 6,636,799 | B2 | * | 10/2003 | D'Amico et al. ........... 701/200 |
| 6,708,113 | B1 | * | 3/2004 | Von Gerlach et al. ...... 701/210 |
| 6,889,139 | B2 | * | 5/2005 | Prabhakaran ............... 701/213 |
| 2001/0002455 | A1 | * | 5/2001 | Uekawa et al. ............. 701/200 |
| 2001/0018636 | A1 | * | 8/2001 | Mizuno ..................... 701/207 |
| 2002/0121990 | A1 | * | 9/2002 | Nomura et al. ............. 340/933 |
| 2002/0147545 | A1 | * | 10/2002 | Norimoto ................... 701/211 |
| 2004/0049335 | A1 | * | 3/2004 | Schmidt et al. ............. 701/201 |

FOREIGN PATENT DOCUMENTS

| EP | 1 139 317 A2 | 10/2001 |
| JP | 2000-28371 A | 1/2000 |
| WO | WO 02/069100 A2 | 9/2002 |

* cited by examiner

*Primary Examiner*—Olga Hernandez
(74) *Attorney, Agent, or Firm*—Sughrue Mion, PLLC

(57) ABSTRACT

When the drive guide is performed by acquiring the drive route information from the information center, a control unit of the navigation terminal receives the information of a partial drive route in the total drive route connecting the place of departure and the place of destination and starts the drive guide on the basis of the received information of partial drive route, even if the information of the total drive route connecting the place of departure and a place of destination is not received.

9 Claims, 2 Drawing Sheets

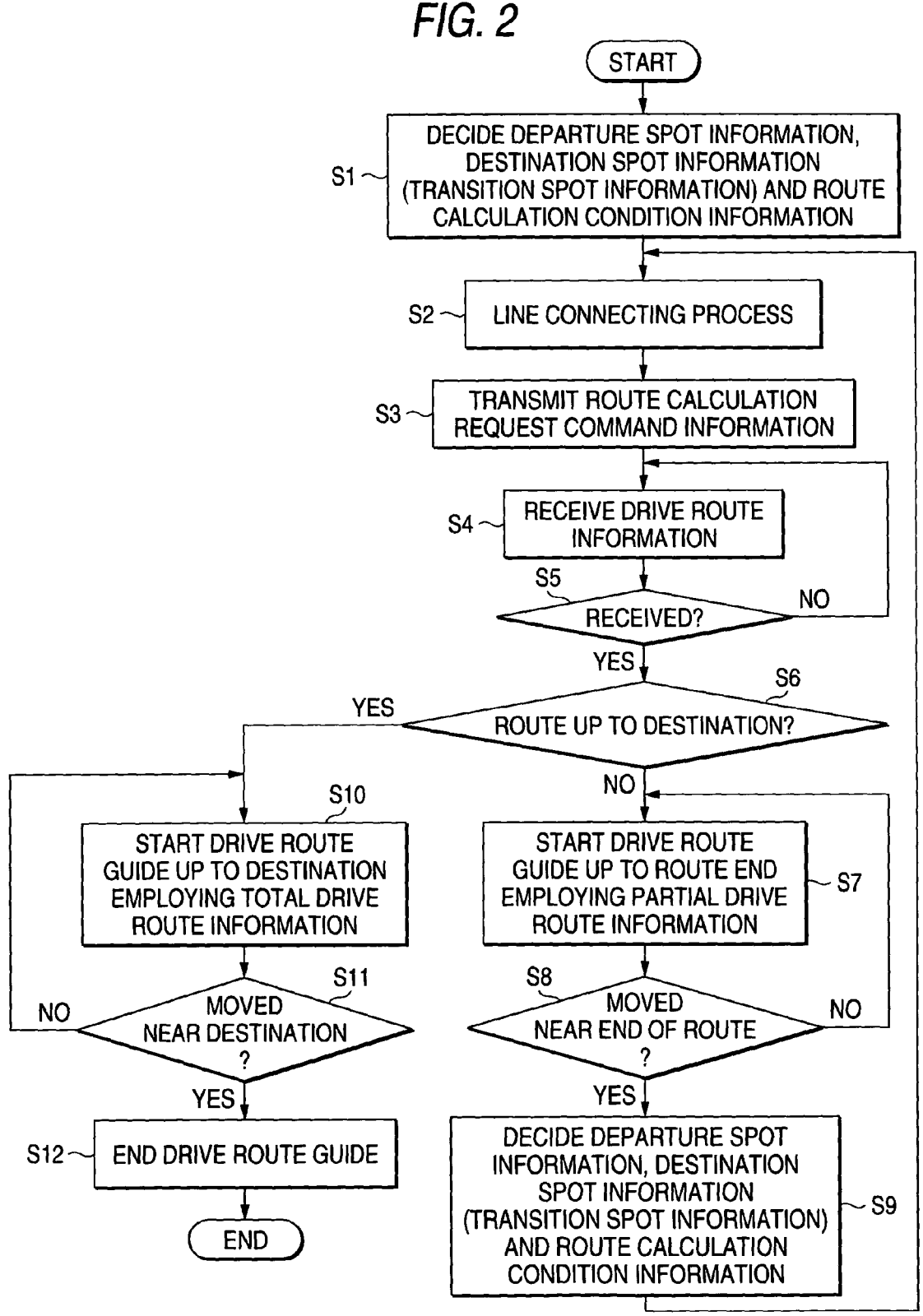

NAVIGATION TERMINAL, NAVIGATION SYSTEM, NAVIGATION PROGRAM AND DRIVE GUIDE METHOD

CROSS REFERENCE OF RELATED APPLICATION

This application is based on and claims priority under 35 U.S.C. §119 with respect to Japanese Patent Application No. 2002-268373 filed on Sep. 13, 2002, the entire content of which is incorporated herein by reference.

BACKGROUND OF THE INVENTION

The present invention relates to a navigation terminal mounted on a mobile unit, and more particularly to a navigation system including a terminal.

A car navigation system that is mounted on a vehicle that is a typical mobile unit displays a map on display unit, based on a current location of the vehicle positioned, with a mark indicating the current location of the self vehicle superposed on its map.

In the car navigation system, a positioning unit for positioning the current location of the vehicle includes a GPS (Global Positioning System) receiver and various self-contained navigation sensors for calculating the current location from the travel distance and the moving direction of the vehicle. Also, the map information for displaying a map on the display unit, the relevant information associated with the map information and various kinds of functional services are provided from an information center located outside the vehicle, employing a communication unit mounted on the vehicle.

There is a functional service as above described such that the information indicating the place of destination and the information indicating the current location as the place of departure are transmitted via a communication unit from a terminal mounted on the vehicle to the information center, and the information center searches a drive route on the basis of the received information, whereby the drive route information indicating the searched drive route is transmitted again via the communication unit from the information center to the terminal. In such a route searching functional service, when the terminal mounted on the vehicle receives the drive route information, it does not always follow that the total drive route information indicating the drive route connecting the place of departure and the place of destination is received at a time.

As an example in which the total drive route information is not received, the communication line connecting the terminal and the information center may be disconnected at the time of receiving data while the mobile unit is driven. Also, as another example, the information amount of total drive route information may exceed the storage capacity of the storage unit provided for the terminal.

In this manner, when the total drive route information is not received, the drive guide is not given, making it impossible to support the driving fully.

SUMMARY OF THE INVENTION

In order to solve the above problems, the present invention provides a navigation terminal including a positioning unit for positioning a current location of a mobile unit, a setting unit for setting up a place of departure and a place of destination, a communication unit for transmitting and receiving information to and from an information center, a temporary storage unit for storing the drive route information received by the communication unit, and a drive guide unit for guiding the driving on the basis of the current location positioned by the positioning unit and the drive route information stored in the temporary storage unit, wherein when the drive route information received by the communication unit is the information of a partial drive route in the total drive route connecting the place of destination and the place of departure that are set up by the setting unit, the guide unit starts the drive guide on the basis of the received information of the partial drive route.

BRIEF DESCRIPTION OF THE DRAWINGS

These and other objects and advantages of this invention will become more fully apparent from the following detailed description taken with the accompanying drawings in which:

FIG. 2 is a flowchart of the navigation system according to the embodiment of the invention.

DETAILED DESCRIPTION OF THE PREFERRED EMBODIMENTS

Figure 1:
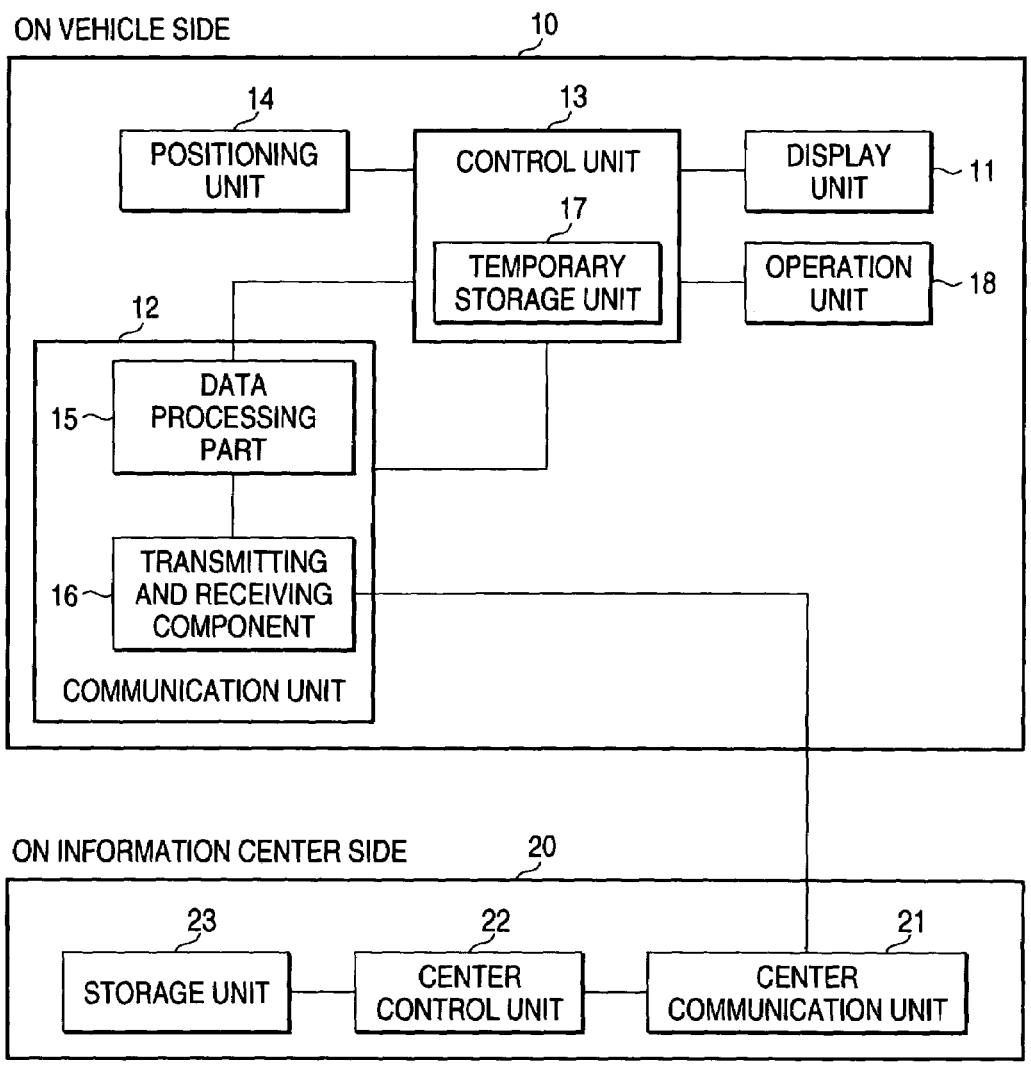
FIG. 1 is a block diagram of the navigation system according to an embodiment of the present invention.

Referring to FIG. 1, an embodiment of the present invention will be described below. This embodiment involves a navigation system employing a navigation terminal of the invention.

In FIG. 1, numeral 10 denotes the navigation terminal mounted on the vehicle that is a mobile unit. The navigation terminal 10 includes a display unit 11, a communication unit 12, a control unit 13 that functions as a display control unit for controlling the display unit 11, functions as a connection control unit for controlling the communication unit 12, and functions as a drive guide unit for guiding the driving on the basis of the drive route guide information as will be described later, a positioning unit 14 for positioning the current location of the vehicle, and an operation unit 18 for enabling the user to input a designation for the place of destination or a search instruction for the route. Also, the communication unit 12 includes a data processing part 15 for processing the data to be transmitted or received, and a transmitting and receiving component 16 for transmitting and receiving the data.

Numeral 20 denotes the configuration of an information center. The information center 20 includes a center communication unit 21 for communicating with a communication unit 21 mounted on the vehicle, a storage unit 23 for storing or accumulating in real time various kinds of information, including the map information and the facility information, the traffic information such as congestion information, the regulation information and accident information on the road, the weather information such as the current weather in each district and the weather forecast, event information held in each district at present or in the future, and a center control unit 22 that functions as a center communication unit control part for controlling the center communication unit 21 to make the communication, functions as a reading control part for controlling reading various kinds of information from the storage unit 23, and functions as a calculation part for calculating the drive route of the vehicle.

As described above, in the navigation system composed of the navigation terminal 10 and the information center 20, various kinds of request commands are transmitted from the navigation terminal 10 to the information center 20 via a communication line connecting the communication unit 12 and the center communication unit 21, and various kinds of information are transmitted from the information center 20 to the navigation terminal 10 in response to commands.

A portable telephone service system and a PHS telephone service system are available for the line connecting the communication unit 12 and the center communication unit 21. Examples of the request command sent from the navigation terminal 10 to the information center 20 may include various kinds of information acquisition commands and functional commands, such as a map request command for acquiring the map information, a route calculation request command for calculating the drive route, a retrieval request command for retrieving a facility or a point, and an information request command for acquiring various kinds of information such as traffic information.

Herein, the map request command will be detailed below. The control unit 13 outputs the map request information including the current location information and the map scale information based on the current location of the vehicle positioned by the positioning unit 14 to the data processing part 15. After various kinds of information is converted into a predetermined format in the data processing part 15, the map request command is transmitted via the transmitting and receiving component 16 to the information center 20.

In the information center 20, the center control unit 22 reads out the map information from the storage unit 23 in response to the map request command acquired via the line connecting the communication unit 12 and the center communication unit 21, and transmits the read map information via the line to the navigation terminal 10.

At the navigation terminal 10, a map is displayed on the display unit 11, based on the map information acquired via the line by the communication unit 12. The control part 13 includes a temporary storage unit 17 for storing the information, whereby various kinds of information acquired from the information center 20, including the map information, is stored and held, as long as they are deleted positively upon an instruction of the user.

A route calculation request command will be detailed below. At the navigation terminal 10, a plurality of screens for enabling the user to decide the place of departure and the place of destination are switched and displayed in succession on the display unit in accordance with a user's operation under the control of the control unit 13.

When the user operates the operation unit 18 on the display by switching it, the place of departure and the place of destination, with the way point, are decided. Herein, the place of departure is the current location of the vehicle positioned by the positioning unit 14 at the decision time, unless the user designates a predetermined point specifically. That is, when the user only decides the place of destination by operating the operation unit, it is judged to acquire the route leading from the current location to the place of destination. The control unit 13 outputs the route calculation request command information, including the departure point information, the destination point information, the bypath point information and the route calculation condition information to the data processing part 15, based on the information in each district, whereby the route calculation request command information is converted into a predetermined format in the data processing part 15, and transmitted as a route calculation request command via the transmitting and receiving component 16 to the information center 20.

In the destination point information, a retrieval request command relating the telephone number information and the postal code information for retrieving the facility or point is transmitted from the navigation terminal 10 to the information center 20. In the information center 20, the detailed information of the facility or point is retrieved from the storage unit 23, based on its information. The navigation terminal 10 acquires the retrieved detailed information, whereby the acquired detailed information is utilized.

At this time, the control unit 13 determines whether or not the line connecting the communication unit 12 and the center communication unit 21 is established. And when established, the route calculation request command is directly transmitted from the navigation terminal 10 to the information center 20.

On the other hand, if the control unit 13 determines that the line connecting the communication unit 12 and the center communication unit 21 is not established, first of all, the control unit 13 functions as a connection control unit for controlling the communication unit 12, and starts a connection process for the line connecting the communication unit 12 and the center communication unit 21. Thereafter, when the connection of the line is established, the information indicating the current location of the vehicle is acquired again from the positioning unit 14 at that time, and this information indicating the current location as the departure point information, together with the destination point information, the bypath point information and the route calculation condition information, is transmitted as the route calculation request command information.

The information center 20 calculates the optical drive route from the map information that the center control unit 22 reads from the storage unit 23, the departure point information, the destination point information and the bypath point information, and the route calculation condition information, on the basis of the route calculation request command acquired via the line connecting the communication unit 12 and the center communication unit 21. And the drive route information based on the calculated drive route and the map information around the peripheral district including its route are read from the storage unit 23, and transmitted via the line to the navigation terminal 10 at the same time.

At the navigation terminal 10, a map in which the drive route is superposed on the display unit 11 is displayed for the drive guide, based on the drive route information that the communication unit 12 acquires via the line and the map information around the peripheral district including its route. This drive route information and the map information around the peripheral district including its route are stored and held in the temporary storage unit 17 within the control part 13.

As another example of transmitting the route calculation request command, when the actual driving of the vehicle deviates from the drive route based on the drive route information acquired as described above, the current location after deviation is defined as the new departure point information, and the departure point information, the destination point information, the bypath point information and the route calculation condition information are automatically transmitted as the route calculation request command.

Moreover, when an interference of traffic such as a traffic congestion or accident is detected to take place on the drive route based on the drive route information acquired, according to the traffic information acquired separately from the information center 20, a new condition for excluding the route where the interference of traffic takes place is added as the route calculation condition, and this route calculation condition information, the departure point information at that time, the destination point information, and the bypath point information are automatically transmitted again as the route calculation request command.

As described above, in the case where the route calculation request command is automatically transmitted when the vehicle deviates from the drive route, or when the interference of traffic such as traffic congestion or accident is detected to take place on the drive route, the control unit 13 determines whether or not the line connecting the communication unit 12 and the center communication unit 21 is established at that time. And when established, the route calculation request command is automatically transmitted from the navigation terminal 10 to the information center 20 at once.

On the other hand, the control unit 13 determines that the line connecting the communication unit 12 and the center communication unit 21 is not established, first of all, the control unit 13 functions as a connection control unit for controlling the communication unit 12, and starts a connection process for the line connecting the communication unit 12 and the center communication unit 21. Thereafter, when the connection of the line is established, the information indicating the current location of the vehicle is acquired again from the positioning unit 14 at that time, and this information indicating the current location as the departure point information, together with the destination point information, the way point information and the route calculation condition information, is transmitted as the route calculation request command information.

The drive guide made by the drive guide unit (control unit 13) at the navigation terminal 10 will be detailed below. The control unit 13 makes the drive guide on the basis of the drive route information stored and held in the temporary storage unit 17 and the information indicating the current location of the vehicle positioned by the positioning unit 14. As this drive guide, the map is superposed with a drive route mark (drive road with color) according to the drive route information on the screen of a display unit 11, or displayed in a format in which a branch point is provided with the arrow indicating the driving direction or the branch point is enlarged, when the vehicle arrives near the branch point on the drive route. Or the driving direction or the building as the landmark may be output in voice.

In the route search function service as described above, when the drive route information is received at the terminal mounted on the vehicle, the total drive route information indicating the drive route connecting the place of departure and the place of destination is received at a time. At this time, if the control unit 13 as the drive guide unit determines that the information of a partial drive route in the total drive route connecting the place of destination and the place of departure is received, the drive guide is started based on the received information of the partial drive route.

As the requirements for the partial drive route information suitable for practicing the drive guide based on the information of this partial drive route, the drive route information preferably includes at least one branch point from near the place of departure. Also, this one branch point preferably involves the branch point information nearest the place of departure on the drive route. Moreover, when the line is disconnected on the way, or the entire drive route information is not received due to insufficient storage capacity of the navigation terminal 10, the drive route of the received drive route information up to the branch point located at the farthest point from the place of departure on the drive route is utilized as the effective partial drive route information.

When the partial drive route information meeting such requirements is received, the drive guide is started at once, supporting the present driving near the place of departure. Moreover, the control unit 13 makes a process for receiving the remaining drive route information regarding the remaining drive route, while conducting the drive guide. As one example of this process, the process for receiving the remaining drive route information may be started immediately after the line is disconnected. As another example, when the vehicle arrives near the branch point located at the farthest point from the place of departure on the drive route, which the received information of the partial drive route indicates, the process for receiving the remaining drive route information may be started.

The information request command will be detailed below. At the navigation terminal 10, a plurality of screens are switched and displayed in succession on the display unit 11 in accordance with the operation of the user under the control of the control part 13 to enable the user to enter the type of required information. The types of information may include the traffic information such as congestion information, regulation information and accident information on the road, the weather information such as the current weather in each district and the weather forecast, and the event information held at present or in the future in each district.

And the control unit 13 outputs the information indicating the type of information input by the user and the district information indicating the required district (e.g., current position information, destination point information, and position information indicating the point or district designated by the user) to the data processing part 15, converted into a predetermined format in the data processing part 15, and transmitted as the information request command via the transmitting and receiving component 16 to the information center 20.

In the information center 20, the center control unit 22 reads the detailed information consistent with the type of information contained in the information request command from the storage unit 23, upon the information request command acquired via the line connecting the communication unit 12 and the center communication unit 21, and transmits it to the navigation terminal 10 via the line.

At the navigation terminal 10, the detailed information is displayed on the display unit 11, based on the detailed information acquired via the line by the communication unit. 12, and when a map display command is input by the user, the map with a mark (congestion mark, accident mark, weather mark, or event mark) for the information superposed is displayed on the display unit 11, based on the detailed information of the facility and the acquired map information. This detailed information is stored and held in the temporary storage unit 17 within the control part 13. Also, the drive trouble such as congestion or accident on the drive route is detected, employing the acquired traffic information.

Referring to FIG. 2, a few examples are given below.

FIG. 2 is a flowchart showing a process for performing the drive guide in which the control unit 13 for the navigation terminal 10 mounted on the vehicle transmits a route calculation request command via the line connecting the navigation terminal 10 and the information center 20, and receives the drive route information from the information center 20.

First of all, at step S1, the departure point information, the destination point information (way point information as required) and the route calculation condition information as the route calculation request command information are decided. Herein, the decision includes the following cases.

That is, when the route is firstly acquired, the user designates the departure point information, the destination point information (way point information as required) and the route calculation condition information for the first time. At this time, the information indicating the current location of the vehicle positioned by the positioning unit 14 at the decision time is defined as the departure point information, unless the user particularly specifies a predetermined point as the place of departure.

Also, in the case where the drive route information is already acquired and employed, to automatically transmit a route calculation request command when the vehicle deviates from the drive route or the drive trouble such as congestion or accident takes place on the drive route, the destination point information (way point information as required) and the route calculation condition information are directly employed from the information decided in acquiring the route for the first time, and the departure point information is employed from the information indicating the current location of the vehicle acquired from the positioning unit 14.

Subsequently, a process for transmitting the route calculation request command information is started (step S2), and it is determined whether or not the connection of the line with the information center 20 is completed (the line is established). If the connection of the line is not completed (the line is not established), a connecting process with the information center 20 is continued or newly started, whereby the connection of the line is completed (the line is established) If it took some time to connect the line, the information indicating the current location of the vehicle is acquired from the positioning unit 14 and set as the departure point information again, when the connection of the line is completed (the line is established).

And the route calculation request command information including this new departure point information is transmitted via the connected line to the information center 20 (step S3).

Subsequently, a process for receiving the drive route information transmitted from the information center 20 is started (step S3). This receiving process may be made while the connection state of the line is maintained, or the line connection may be restarted upon a trigger from the information center 20 after suspending for a while.

If the receiving process is started, the reception of the drive route information is then confirmed (step S5). Then, it is determined whether or not the received drive route information is the drive route up to the place of destination (step S6). That is, at step S6, it is determined whether the received drive route information involves the total drive route from the departure point to the destination point or its partial drive route. Also, at step S6, it is determined whether or not the received information of the partial drive route satisfies the above condition. In this determination, if the above condition is not satisfied, the transfer process is stopped, and the procedure goes to step S1 again to start the procedure anew.

At step S6, if the information of partial drive route is received, the drive guide is started based on the received partial drive route (step S7).

Subsequently, the vehicle is moved along with the drive guide, and it is determined whether or not the vehicle has arrived near the branch point located at the farthest point from the departure point on the drive route indicated by the information of partial drive route (step S8). Herein, if the vehicle has not arrived, the procedure goes to step S7 to continue the drive guide based on the information of partial drive route.

On the other hand, if the vehicle has arrived near the branch point, a process for receiving the remaining drive route information is performed by deciding again the route calculation request command information, including the departure point information, the destination point information (way point information as required) and the route calculation condition information (step S9). At this time, the departure point information is the information indicating the current location of the vehicle positioned by the positioning unit 14 at that time.

Thereafter, the procedure goes to step S2 again to perform the above procedure. And the same procedure is repeated until it is determined that the received drive route information is the total drive route information at step S6 again.

If it is determined that the received drive route information is the total drive route information at step S6, the drive guide is started based on the information of the total drive route (step S10).

Subsequently, the vehicle is moved along with the drive guide, and it is determined whether or not the vehicle has arrived near the place of destination on the drive route indicated by the information of total drive route (step S11). Herein, if the vehicle has not arrived, the procedure goes to step S10 to continue the drive guide based on the information of total drive route.

If the vehicle has arrived near the place of destination, the route guide is finished and the procedure in series is ended.

As described above, in this example, it is determined whether or not the received drive route information involves the total drive route from the departure point to the destination point, or its partial drive route. If the partial drive route information is received, the drive guide is immediately started, based on the received information of partial drive route, making it possible to support the driving near the place of departure at once.

In the above example, at step S9, the new departure point information, as well as the destination point information (way point information as required) and the route calculation condition information again are transmitted. However, when the destination point information (way point information as required) and the route calculation condition information are transmitted as the route calculation request command information to the information center 20 for the first time, they are stored together with the information identifying the navigation terminal 10 in the information center 20, and the information stored is employed when the drive route is acquired.

In this manner, in acquiring the new drive route, the new departure point information alone is transmitted as the route calculation request command information to the information center 20, whereby the amount of information to be transmitted is decreased, and the time necessary for communication or the communication cost is reduced.

Also, when the route calculation request command information is transmitted from the navigation terminal 10, the information indicating the storable capacity of information within the navigation terminal 10 is transmitted at the same time, whereby the information center 20 can transmit the drive route information having the information amount corresponding to the storable capacity of information.

Also, in consideration of the possibility that the line is disconnected on the way, the drive route information near the place of departure is firstly transmitted from the information center 20, whereby when the information of partial drive route is received, the drive guide near the place of departure is securely conducted to support the driving.

Also, in the above example, at step S8, the vehicle is moved along with the drive guide, and it is determined whether or not the vehicle has arrived near the branch point located at the farthest point from the departure point on the drive route indicated by the information of partial drive route. If the vehicle has arrived near the branch point, a process for receiving the remaining drive route information is performed by deciding again the route calculation request command information, including the departure point information, the destination point information (way point information as required) and the route calculation condition information (step S9). If the vehicle is moved not near the branch point but in an area full distance from the branch point (e.g., within 100 km around the branch point as the center), the process for receiving the remaining drive route information (step S9) may be performed. In this case, even if the communication line is not connected, the process for connecting the communication line may be repeated several times, while the drive guide is continued based on the received information of partial drive route.

In the embodiment and example as described above, the device is mounted on the vehicle. However, this invention is also applicable to the portable telephone terminal having the positioning unit mounted or the system using the terminal unit.

In the embodiment and example as described above, the computer program may be configured to enable the computer to perform the same functions.

What is claimed is:

1. A navigation terminal comprising:
   a positioning unit for positioning a current location of a mobile unit;
   a setting unit for setting up a place of departure and a place of destination;
   a communication unit for transmitting and receiving information to and from an information center;
   a temporary storage unit for storing the drive route information received by the communication unit; and
   a drive guide unit for guiding the driving on the basis of the current location positioned by the positioning unit and the drive route information stored in the temporary storage unit, wherein
   when the communication unit attempts to receive information of a drive route connecting the place of destination and the place of departure that are set up by the setting unit, but can not receive all of the information of the drive route, and the communication unit receives part of the information of the drive route which meets a predetermined requirement, the drive guide unit starts guiding on the basis of the received information.

2. The navigation terminal according to claim 1, wherein the communication unit transmits a request to acquire information of a drive route connecting from an end of a drive route indicated by the received information to the place of destination from the information center, while the drive guide unit is guiding on the basis of the received information.

3. A navigation system comprising:
   a navigation terminal including a positioning unit for positioning a current location of a mobile unit, a setting unit for setting up a place of departure and a place of destination, a communication unit for transmitting and receiving information to and from an information center, a temporary storage unit for storing the drive route information received by the communication unit, and a drive guide unit for guiding the driving on the basis of the current location positioned by the positioning unit and the drive route information stored in the temporary storage unit;
   an information center having a center communication unit for receiving the information indicating the place of departure and the place of destination transmitted by the communication unit; and
   a drive route calculation part for calculating the drive route on the basis of the information indicating the place of departure and the place of destination received by the center communication unit, wherein
   when the communication unit attempts to receive information of a drive route connecting the place of destination and the place of departure that are set up by the setting unit, but can not receive all of the information of the drive route, and the communication unit receives part of the information of the drive route which meets a predetermined requirement, the drive guide unit starts guiding on the basis of the received information.

4. A computer program making a computer function as a navigation terminal comprising:
   a positioning unit for positioning a current location of a mobile unit;
   a setting unit for setting up a place of departure and a place of destination;
   a communication unit for transmitting and receiving information to and from an information center;
   a temporary storage unit for storing the drive route information received by the communication unit; and a
   drive guide unit for guiding the driving on the basis of the current location positioned by the positioning unit and the drive route information stored in the temporary storage unit, wherein
   when the communication unit attempts to receive information of a drive route connecting the place of destination and the place of departure that are set up by the setting unit, but can not receive all of the information of the drive route, and the communication unit receives part of the information of the drive route which meets a predetermined requirement, the drive guide unit starts guiding on the basis of the received information.

5. A computer program making a computer function as a navigation system comprising:
   a navigation terminal including a positioning unit for positioning a current location of a mobile unit, a setting unit for setting up a place of departure and a place of destination, a communication unit for transmitting and receiving information to and from an information center, a temporary storage unit for storing the drive route information received by the communication unit, and a drive guide unit for guiding the driving on the basis of the current location positioned by the positioning unit and the drive route information stored in the temporary storage unit;
   an information center having a center communication unit for receiving the information indicating the place of departure and the place of destination transmitted by the communication unit; and
   a drive route calculation part for calculating the drive route on the basis of the information indicating the place of departure and the place of destination received by the center communication unit, wherein
   when the communication unit attempts to receive information of a drive route connecting the place of destination and the place of departure that are set up by the setting unit, but can not receive all of the information of the drive route, and the communication unit receives part of the information of the drive route which meets a predetermined requirement, the drive guide unit starts guiding on the basis of the received information.

6. A drive guide method for use at a navigation terminal, the navigation terminal including a positioning unit for positioning a current location of a mobile unit, a setting unit for setting up a place of departure and a place of destination, a communication unit for transmitting and receiving information to and from an information center, a temporary storage unit for storing the drive route information received by the communication unit; and a drive guide unit for guiding the driving on the basis of the current location positioned by the positioning unit and the drive route information stored in the temporary storage unit, the method comprising:

receiving information from the information center by the communication unit; and when the communication unit attempt to receive information of a drive route connecting the place of destination and the place of departure that are set up by the setting unit, but can not receive all of the information of the drive route, and the communication unit receives part of the information of the drive route which meets a predetermined requirement, starting to guide driving by the drive guide unit on the basis of the received information the part of the total drive-route.

7. The navigation terminal according to claim 1, wherein the part of the information of the drive route which is meets the predetermined requirement is information of a drive route near the set place of departure.

8. The navigation terminal according to claim 7, wherein the part of the information of the drive route which meets the predetermined requirement is information of a drive route including at least one branch point near the place of departure.

9. The navigation terminal according to claim 2, wherein the communication unit transmits the request information when the mobile unit nears the end of the drive route indicated by the received information.

* * * * *